United States Patent
Makled et al.

(10) Patent No.: US 10,597,033 B2
(45) Date of Patent: Mar. 24, 2020

(54) MONITORING AND ADJUSTMENT OF GAPS BETWEEN VEHICLES

(71) Applicant: Ford Global Technologies, LLC, Dearborn, MI (US)

(72) Inventors: Daniel A. Makled, Dearborn, MI (US); Michael McQuillen, Warren, MI (US); Nitendra Nath, Troy, MI (US); Nicolas Salciccioli, Birmingham, MI (US); Aaron L. Mills, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 212 days.

(21) Appl. No.: 15/832,261

(22) Filed: Dec. 5, 2017

(65) Prior Publication Data
US 2019/0168754 A1    Jun. 6, 2019

(51) Int. Cl.
*B60W 30/16* (2020.01)
*B60W 30/14* (2006.01)

(52) U.S. Cl.
CPC .......... *B60W 30/16* (2013.01); *B60W 30/143* (2013.01); *B60W 2550/148* (2013.01); *B60W 2550/30* (2013.01); *B60W 2550/408* (2013.01)

(58) Field of Classification Search
CPC ............... B60W 30/16; B60W 30/143; B60W 2550/148; B60W 2550/30; B60W 2550/408; B60T 2201/02; B60T 2201/022; B60T 2201/024; B60T 2201/08; B60T 2201/081; B60T 2201/085; B60T 2201/083; B60T 2201/088; B60T 2201/12; G05D 13/00; G05D 1/0246

USPC .......... 340/901, 902, 903, 933, 988; 701/93
See application file for complete search history.

(56) References Cited

U.S. PATENT DOCUMENTS

| | | |
|---|---|---|
| 6,708,099 B2 * | 3/2004 | Tellis ................. B60K 31/0008 180/167 |
| 8,204,678 B2 | 6/2012 | Matsuno |
| 8,694,222 B2 | 4/2014 | Zagorski |
| 9,327,693 B2 | 5/2016 | Wolf |
| 9,505,405 B2 | 11/2016 | Stanek et al. |
| 9,586,584 B2 | 3/2017 | Parikh et al. |

FOREIGN PATENT DOCUMENTS

JP    2007186141 A    7/2007

OTHER PUBLICATIONS

NHTSA, *Why Your Reaction Time Matters at Speed*, Aug. 2015, 4 pages.

* cited by examiner

*Primary Examiner* — Anthony R Jimenez
(74) *Attorney, Agent, or Firm* — Frank Lollo; Eversheds Sutherland (US) LLP

(57) ABSTRACT

Method and apparatus are disclosed for monitoring and adjustment of gaps between vehicles. An example vehicle includes a rear sensing device and a controller. The controller is to determine a target lead gap for following a lead vehicle during adaptive cruise control and measure, via the rear sensing device, a trailing distance to a trailing vehicle. The controller also is to determine a target trailing gap for the trailing vehicle. The example vehicle also includes a cruise control unit to increase, responsive to the trailing distance being less than the target trailing gap, the target lead gap based on the trailing distance.

20 Claims, 4 Drawing Sheets

MONITORING AND ADJUSTMENT OF GAPS BETWEEN VEHICLES

TECHNICAL FIELD

The present disclosure generally relates to vehicles and, more specifically, to monitoring and adjustment of gaps between vehicles.

BACKGROUND

Oftentimes, vehicles include cruise control devices, systems, and/or software that performs autonomous and/or semi-autonomous vehicle motive functions. Typically, a cruise control system enables an operator of a vehicle (e.g., a driver) to set a target speed of travel for the vehicle. Upon receiving the setting from the vehicle operator, the cruise control system autonomously controls the speed at which the vehicle travels to be the target speed. Recently, some vehicles include adaptive cruise control devices, systems, and/or software that autonomously decelerate a vehicle from the target speed upon detecting that the vehicle is approaching an object (e.g., a slower moving vehicle).

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for monitoring and adjustment of gaps between vehicles. An example disclosed vehicle includes a rear sensing device and a controller. The controller is to determine a target lead gap for following a lead vehicle during adaptive cruise control and measure, via the rear sensing device, a trailing distance to a trailing vehicle. The controller also is to determine a target trailing gap for the trailing vehicle. The example disclosed vehicle also includes a cruise control unit to increase, responsive to the trailing distance being less than the target trailing gap, the target lead gap based on the trailing distance.

Some examples further include a cruise control unit is to decrease the vehicle speed to increase a lead distance to the lead vehicle to the target lead gap. In some examples, the rear sensing device includes a camera. In some examples, the rear sensing device includes a proximity sensor that includes at least one of a radar sensor, a lidar sensor, and an ultrasonic sensor.

Some examples further include a front sensing device for monitoring the lead vehicle. In some such examples, the controller compares the trailing distance and the target lead gap upon the front sensing device detecting the lead vehicle and the rear sensing device detecting the trailing vehicle. Some such examples further include a cruise control unit that increases the vehicle speed responsive to the controller determining that a lead distance measured by the front sensing device is greater than the target lead gap. In some examples, the cruise control unit decreases the vehicle speed responsive to the controller determining the lead distance is less than the target lead gap.

Some examples further include a vehicle speed sensor to detect a vehicle speed. In some such examples, the controller determines the target lead gap based on the vehicle speed. In some examples, the controller determines the target trailing gap based on a trailing vehicle speed of the trailing vehicle. Some such examples further include a dedicated short-range communication module to receive the trailing vehicle speed via vehicle-to-vehicle communication. In some examples, the controller determines the target trailing gap based on a coefficient of friction of a road and a perception reaction time of a driver. Some such examples further include a GPS receiver to identify a vehicle location and a communication module to retrieve the friction coefficient of the road surface from an external network based on the vehicle location.

Some examples further include a brake control module that applies emergency braking for pre-collision assist based upon the trailing distance being less than the target trailing gap. In some such examples, the brake control module decreases a deceleration rate for the emergency braking responsive to the controller determining that the trailing distance is less than the target trailing gap.

An example disclosed method includes determining, via a processor, a target lead gap for a vehicle to follow a lead vehicle during adaptive cruise control and measuring, via a rear sensing device of the vehicle, a trailing distance to a trailing vehicle. The example disclosed method also includes determining, via the processor, a target trailing gap for the trailing vehicle and increasing the target lead gap based on the trailing distance responsive to the trailing distance being less than the target trailing gap.

Some examples further include decreasing, via a cruise control unit, the vehicle speed to increase the target lead gap to the lead vehicle during adaptive cruise control. Some examples further include measuring, via a front sensing device, a lead distance to the lead vehicle and increasing, via the processor, the vehicle speed responsive to determining the lead distance is greater than the target lead gap. Some examples further include decreasing, via a brake control module, a deceleration rate for emergency braking responsive to determining the trailing distance is less than the target trailing gap.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
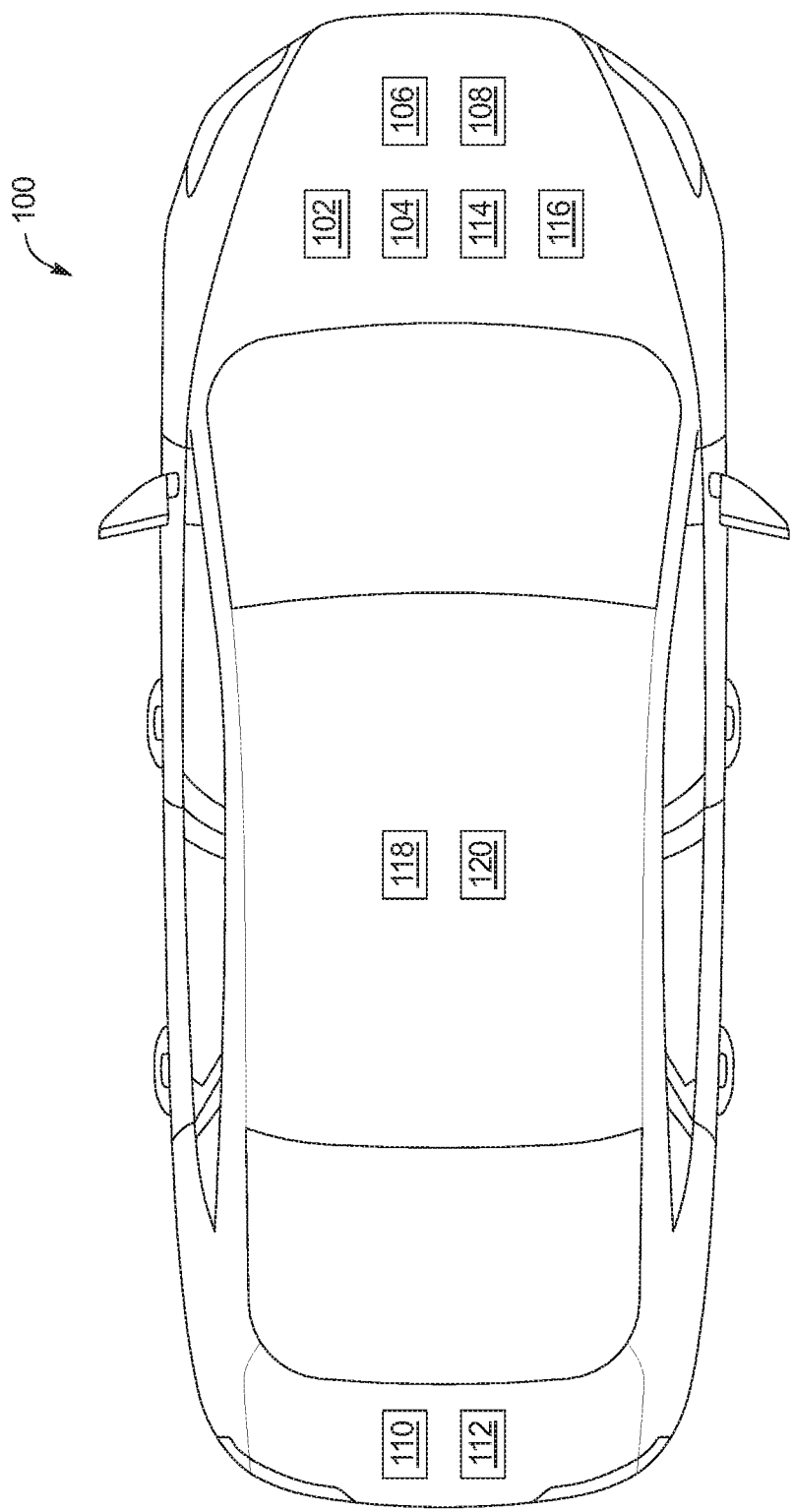
FIG. 1 illustrates an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Oftentimes, vehicles include cruise control feature(s) that perform autonomous and/or semi-autonomous vehicle motive functions. Typically, a cruise control system enables an operator of a vehicle (e.g., a driver) to set a target speed of travel for the vehicle. Upon receiving the setting from the vehicle operator, the cruise control system autonomously controls the speed at which the vehicle travels to be the target speed. As used herein, "cruise control" refers to a system and/or a vehicle setting that enables a vehicle to autonomously and/or semi-autonomously travel at a target speed set by an operator of the vehicle.

Recently, some vehicles include adaptive cruise control feature(s) that autonomously decelerate a vehicle from a target speed upon detecting that the vehicle is approaching an object (e.g., a slower moving lead vehicle). As used herein, "adaptive cruise control" refers to a system and/or a vehicle that enables a vehicle to autonomously and/or semi-autonomously travel at a target speed set by an operator of the vehicle, accelerate to the target speed, and decelerate upon detecting that the vehicle is approaching another object (e.g., a slower moving vehicle).

In some instances, a host vehicle that is utilizing adaptive cruise control to follow a lead vehicle is also being followed by a trailing vehicle. In some such instances, the trailing vehicle is traveling so closely behind the host vehicle that the trailing vehicle is unable to decelerate in time to avoid colliding with the host vehicle as the host vehicle quickly decelerates (colloquially referred to as tailgating), for example, as a result of the adaptive cruise control detecting that the lead vehicle is stopping and/or otherwise decelerating quickly.

Example methods and apparatus disclosed herein (a) detect when a trailing vehicle is closely following a host vehicle that has adaptive cruise control activated and (b) subsequently increase a distance at which the host vehicle follows a lead vehicle (c) to enable the host vehicle to decelerate at a slower rate upon detecting that the lead vehicle is decelerating (i) to prevent the host vehicle from colliding with (colloquially referred to as rear-ending) the lead vehicle as the lead vehicle decelerates and (ii) to deter the trailing vehicle from colliding with (colloquially referred to as rear-ending) the host vehicle as the host vehicle decelerates in response to the lead vehicle decelerating.

Examples disclosed herein include an adaptive cruise control system of a host vehicle. The system detects when there is a lead vehicle and a trailing vehicle of the host vehicle. The system measures a front time gap between the host vehicle and the lead vehicle and also measures a rear time gap between the host vehicle and the trailing vehicle. Further, the system of the examples disclosed herein identifies a target front time gap and a target rear time gap. Upon determining that the measured rear time gap is less than the target rear time gap, the system decelerates the host vehicle to increase the distance between the host vehicle and the lead vehicle (to enable the host vehicle to brake more gradually upon detecting that the lead vehicle is braking). Upon determining that the measured front and rear time gaps are greater than the target front and rear time gaps, respectively, the system accelerates the host vehicle to reduce the distance between the host vehicle and the lead vehicle.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be semi-autonomous (e.g., some routine motive functions controlled by the vehicle 100) or autonomous (e.g., motive functions are controlled by the vehicle 100 without direct driver input).

In the illustrated example, the vehicle 100 includes a vehicle speed sensor 102 and a global positioning system (GPS) receiver 104. For example, the vehicle speed sensor 102 detects a speed at which the vehicle 100 is traveling. In some examples, the vehicle speed sensor 102 monitors the speed of the vehicle 100 over a period of time to detect an acceleration and/or deceleration of the vehicle 100. Further, the GPS receiver 104 receives a signal from a global positioning system to identify a location of the vehicle 100. In some examples, the GPS receiver 104 identifies the location of the vehicle 100 over a period of time to enable a speed at which the vehicle 100 is traveling to be determined.

The vehicle 100 of the illustrated example also includes a proximity sensor 106 (also referred to as a front proximity sensor), a camera 108 (also referred to as a front camera), a proximity sensor 110 (also referred to as a rear proximity sensor), and a camera 112 (also referred to as a rear camera). The proximity sensor 106, the camera 108, the proximity sensor 110, and the camera 112 are sensing devices that monitor a surrounding area of the vehicle 100. For example, the proximity sensor 106 and the camera 108 are front sensing devices that monitor an area and/or object(s) (e.g., a lead vehicle 202 of FIGS. 2A-2E) in front of the vehicle 100, and the proximity sensor 110 and the camera 112 are rear sensing devices that monitor an area and/or object(s) (e.g., a trailing vehicle 204 of FIGS. 2A-2E) behind the vehicle 100. The proximity sensor 106 (e.g., a radar sensor, a lidar sensor, an ultrasonic sensor, etc.) is configured to detect a presence of, a relative location of, and/or a distance to object(s) positioned in front of the vehicle 100. Further, the camera 108 is configured to capture image(s) and/or video that are utilized to detect a presence of, a relative location of, and/or a distance to object(s) positioned in front of the vehicle 100. The proximity sensor 110 (e.g., a radar sensor, a lidar sensor, an ultrasonic sensor, etc.) is configured to detect a presence of, a relative location of, and/or a distance to object(s) positioned behind the vehicle 100. Further, the camera 112 is configured to capture image(s) and/or video that are utilized to detect a presence of, a relative location of, and/or a distance to object(s) positioned behind the vehicle 100.

As illustrated in FIG. 1, the vehicle 100 includes a communication module 114 that is a dedicated short-range communication (DSRC) module. The communication module 114 includes antenna(s), radio(s) and software to broadcast messages and to establish connections with other vehicles (e.g., the lead vehicle 202, the trailing vehicle 204) via vehicle-to-vehicle (V2V) communication, infrastructure-based modules via vehicle-to-infrastructure (V2I) communication, and mobile device-based modules via other V2X communication. More information on the DSRC network and how the network may communicate with vehicle hardware and software is available in the U.S. Department of Transportation's Core June 2011 System Requirements Specification (SyRS) report (available at http://www.its.dot.gov/meetings/pdf/CoreSystem_SE_SyRS_RevA %20 (2011-06-13).pdf), which is hereby incorporated by reference in its entirety along with all of the documents referenced on pages 11 to 14 of the SyRS report. DSRC systems may be installed on vehicles and along roadsides on infrastructure. DSRC systems incorporating infrastructure information is known as a "roadside" system. DSRC may be combined with other technologies, such as Global Position System (GPS), Visual Light Communications (VLC), Cellular Communications, and short range radar, facilitating the vehicles communicating their position, speed, heading, relative position to other objects and to exchange information with other vehicles or external computer systems. DSRC systems can be integrated with other systems such as mobile phones.

Currently, the DSRC network is identified under the DSRC abbreviation or name. However, other names are sometimes used, usually related to a Connected Vehicle program or the like. Most of these systems are either pure DSRC or a variation of the IEEE 802.11 wireless standard. However, besides the pure DSRC system it is also meant to cover dedicated wireless communication systems between cars and roadside infrastructure system, which are integrated with GPS and are based on an IEEE 802.11 protocol for wireless local area networks (such as, 802.11p, etc.).

Further, the vehicle 100 of the illustrated example includes another communication module 116 that includes wired or wireless network interfaces to enable communication with external networks. The communication module 116 also includes hardware (e.g., processors, memory, storage, antenna, etc.) and software to control the wired or wireless network interfaces. In the illustrated example, the communication module 116 includes one or more communication controllers for cellular networks (e.g., Global System for Mobile Communications (GSM), Universal Mobile Telecommunications System (UMTS), Long Term Evolution (LTE), Code Division Multiple Access (CDMA)), Near Field Communication (NFC) and/or other standards-based networks (e.g., WiMAX (IEEE 802.16m); Near Field Communication (NFC), local area wireless network (including IEEE 802.11 a/b/g/n/ac or others), Wireless Gigabit (IEEE 802.11ad), etc.). In some examples, the communication module 116 includes a wired or wireless interface (e.g., an auxiliary port, a Universal Serial Bus (USB) port, a Bluetooth® wireless node, etc.) to communicatively couple with a mobile device (e.g., a smart phone, a wearable, a smart watch, a tablet, etc.). In such examples, the vehicle 100 may be communicated with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols.

The vehicle 100 of the illustrated example also includes a cruise control unit 118 that is configured to perform autonomous and/or semi-autonomous motive functions for cruise control and/or adaptive cruise control for the vehicle 100. For example, the cruise control unit 118 performs autonomous and/or semi-autonomous motive functions to enable the vehicle 100 to travel at a target speed set by a vehicle operator (e.g., a driver), accelerate to the target speed, to decelerate upon detecting that the vehicle 100 is approaching another object (e.g., the lead vehicle 202), and/or to travel behind another vehicle (e.g., the lead vehicle 202) by a predetermined distance (e.g., a target lead gap 210 of FIGS. 2A-2E). That is, the cruise control unit 118 controls a speed, acceleration, and/or deceleration of the vehicle 100 based upon the target speed set by the vehicle operator and information of a surrounding area of the vehicle that is collected, for example, via the vehicle speed sensor 102, the GPS receiver 104, the proximity sensor 106, the camera 108, the proximity sensor 110, the camera 112, the communication module 114, etc.

The vehicle 100 also includes a gap controller 120 for monitoring lead vehicles and trailing vehicles. For example, the gap controller 120 is configured to measure a distance (e.g., a lead distance) to a lead vehicle in front of the vehicle 100, determine a target gap (e.g., a target trailing gap) for safely following a lead vehicle, measure a distance (e.g., a trailing distance) to a trailing vehicle behind the vehicle 100, and determine a target gap (e.g., a target trailing gap) for safely leading a trailing vehicle. Further, the gap controller 120 of the vehicle 100 is configured to adjust a target lead gap to a lead vehicle based upon a measured distance to a trailing vehicle. For example, in response to determining that a trailing distance between the vehicle 100 and the trailing vehicle is less than a target trailing gap, the gap controller 120 increases a target lead gap between the vehicle 100 and the lead vehicle. By increasing the target lead gap by which the vehicle 100 follows the lead vehicle, the gap controller 120 enables the cruise control unit 118 to decelerate more slowly when the lead vehicle decelerates (e.g., slows down, stops) to reduce a risk of the trailing vehicle colliding with the vehicle 100 as the vehicle 100 decelerates. By increasing the target lead gap, the gap controller 120 also enables a pre-collision assist system of the vehicle 100 to decelerate the vehicle 100 (e.g., when cruise control is active or inactive) more slowly when the lead vehicle decelerates to further reduce a risk of the trailing vehicle colliding with the vehicle 100 as the vehicle 100 decelerates.

Figure 2A:
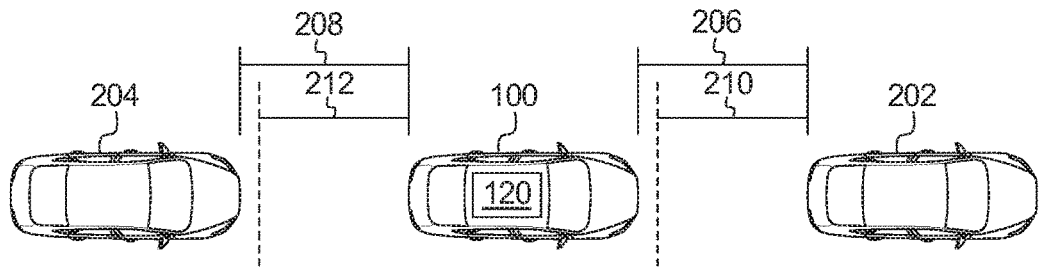
FIGS. 2A-2E illustrate scenarios in which the vehicle of FIG. 1 is following a lead vehicle and in front of a trailing vehicle.
Figure 2B:
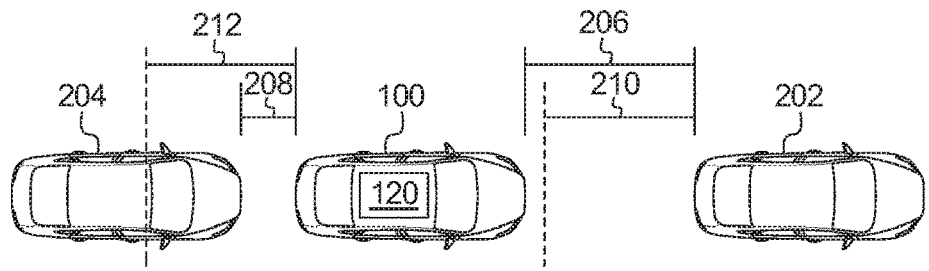
Figure 2C:
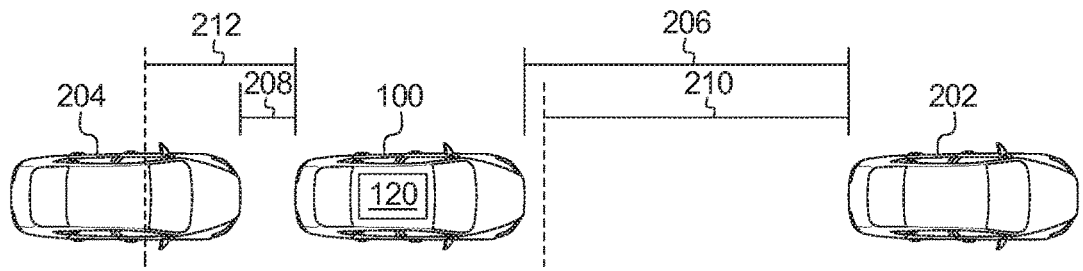
Figure 2D:
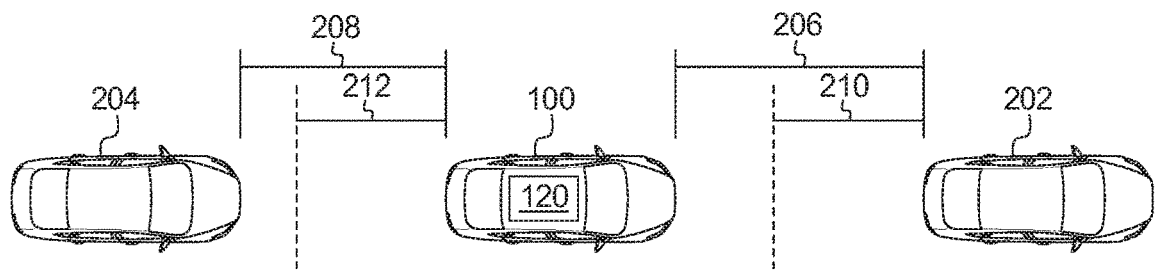
Figure 2E:
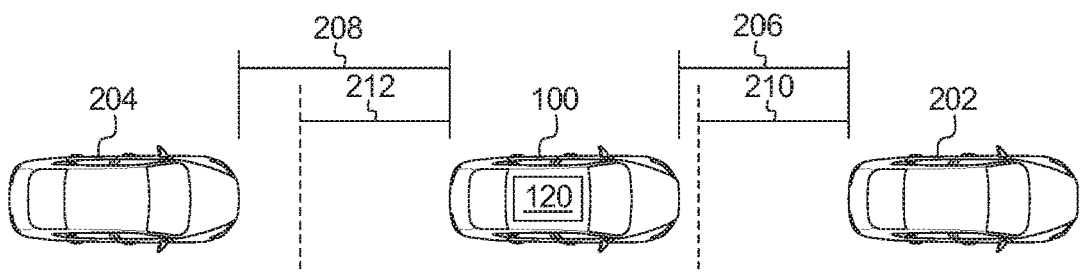

FIGS. 2A-2E illustrate scenarios in which the vehicle 100 (also referred to as a host vehicle) is following a lead vehicle 202 and in front of a trailing vehicle 204. More specifically, FIG. 2A depicts a first scenario, FIG. 2B depicts a second scenario, FIG. 2C depicts a third scenario, FIG. 2D depicts a fourth scenario, and FIG. 2E depicts a fifth scenario in which the vehicle 100 is following the lead vehicle 202 and the trailing vehicle 204 is following the vehicle 100.

As illustrated in FIGS. 2A-2E, the vehicle 100 is spaced apart from the lead vehicle 202 by a lead distance 206 and is spaced apart from the trailing vehicle 204 by a trailing distance 208. That is, the lead distance 206 separates the vehicle 100 and the lead vehicle 202 as the vehicle 100 follows the lead vehicle 202, and the trailing distance 208 separates the vehicle 100 and the trailing vehicle 204 as the vehicle 100 leads the trailing vehicle 204. For example, the gap controller 120 measures the lead distance 206 via the proximity sensor 106, the camera 108, and/or another front sensing device of the vehicle 100. In some examples, the gap controller 120 measures the lead distance 206 based upon a fusion of data that is collected by the proximity sensor 106, the camera 108, and/or other front sensing device(s). Further, the gap controller 120 measures the trailing distance 208 via the proximity sensor 110, the camera 112, and/or another rear sensing device of the vehicle 100. In some examples, the gap controller 120 measures the trailing distance 208 based upon a fusion of data that is collected by the proximity sensor 110, the camera 112, and/or other rear sensing device(s). Additionally or alternatively, the gap controller 120 is configured to receive the lead distance 206 and/or the trailing distance 208 via the communication module 114. For example, the lead vehicle 202 may measure the lead distance 206 and send the measurement to the communication module 114 via V2V communication and/or the trailing vehicle 204 may measure the trailing distance 208 and send the measurement to the communication module 114 via V2V communication.

Further, as illustrated in FIGS. 2A-2E, the lead distance 206 and the trailing distance 208 may be less than, greater than, and/or equal to a target lead gap 210 and a target trailing gap 212, respectively. For example, the target lead gap 210 is utilized for following the lead vehicle 202 during adaptive cruise control and/or for emergency braking of a pre-collision assist system. The gap controller 120 determines the target lead gap 210 and the target trailing gap 212 to facilitate avoidance of a collision with the lead vehicle 202 and/or the trailing vehicle 204 while the cruise control unit 118 is performing autonomous cruise control for the vehicle 100. For example, the target lead gap 210 corresponds to a distance between the vehicle 100 and the lead vehicle 202 that enables the vehicle 100 to brake without colliding with the lead vehicle 202 upon detection that the lead vehicle 202 is stopping and/or otherwise braking. The target trailing gap 212 corresponds to a distance between the vehicle 100 and the trailing vehicle 204 that enables the trailing vehicle 204 to brake without colliding with the vehicle 100 upon detection that the vehicle 100 is stopping and/or otherwise braking.

In some examples, the target lead gap 210 is a predetermined factory setting. In other examples, the target lead gap 210 is a user-adjustable setting for cruise control and/or adaptive cruise control. In some such examples, the gap controller 120 prevents the target lead gap 210 from being set below a threshold distance that corresponds to a time-to-collision calculated by the gap controller 120 for pre-collision assist and/or adaptive cruise control. Further, in some examples, the target lead gap 210 equals the threshold distance that corresponds to the time-to-collision calculated by the gap controller 120. Pre-collision assist is a system of the vehicle 100 that enables the vehicle 100 to autonomously stop the vehicle 100 while the vehicle 100 is otherwise being operated by a driver and/or cruise control upon detection (e.g., via the proximity sensor 106 and/or the camera 108) of a slower moving and/or stationary object in front of the vehicle 100 to prevent the vehicle 100 from colliding with the detected object. The time-to-collision corresponds with the time it would take for the vehicle 100 to collide with the lead vehicle 202 if the lead vehicle 202 were to stop and the vehicle 100 were to brake upon detecting that the lead vehicle 202 is stopping. The threshold distance corresponding to the time-to-collision is the minimum distance between the vehicle 100 and the lead vehicle 202 that enables the vehicle 100 to brake without colliding with the lead vehicle 202. For example, the gap controller 120 calculates the time-to-collision based on the following equation:

$$TTC = \sqrt{\dot{r}^2 - 2r\ddot{r}} \pm \frac{\dot{r}}{\ddot{r}} \qquad \text{Equation 1}$$

In Equation 1 provided above, TTC refers the time-to-collision, r refers the lead distance 206, $\dot{r}$ refers to the speed of the vehicle 100, and $\ddot{r}$ refers to the acceleration of the vehicle 100. That is, the gap controller 120 is configured to determine the target lead gap 210 based on the lead distance 206, the speed of the vehicle 100, and/or the acceleration of the vehicle 100. In other words, the target lead gap 210 is a function of the lead distance 206, the speed of the vehicle 100, and/or the acceleration of the vehicle 100.

Further, the target trailing gap 212 is determined by the gap controller 120. For example, the target trailing gap 212 corresponds with a distance between the vehicle 100 and the trailing vehicle 204 that enables the trailing vehicle 204 to brake such that the trailing vehicle 204 avoids colliding with the vehicle 100 as the vehicle brakes and/or otherwise decelerates.

For example, the gap controller 120 calculates the target trailing gap 212 based on the following equation:

$$d_r = \dot{r}_r t + \frac{\dot{r}_r}{2\mu g} \qquad \text{Equation 2}$$

In Equation 2 provided above, $d_r$ refers to the target trailing gap 212, r refers to the trailing distance 208, needed for trailing to brake, $\dot{r}_r$ refers to a speed of the trailing vehicle 204, t refers to a perception reaction time of an operator (e.g., a driver) of the trailing vehicle 204, μ refers to a coefficient of friction of a road along which the trailing vehicle 204 is traveling, and g refers to gravity. That is, the gap controller 120 determines the target trailing gap 212 based on the trailing distance 208, the speed of the trailing vehicle 204, the perception reaction time of the driver of the trailing vehicle 204, and/or the coefficient of friction of the road along which the trailing vehicle 204 is traveling. In other words, the target trailing gap 212 is a function of the trailing distance 208, the speed of the trailing vehicle 204, the perception reaction time of the driver of the trailing vehicle 204, and/or the coefficient of friction of the road.

In some examples, the gap controller 120 determines the speed of the trailing vehicle 204 based upon measurements of the vehicle speed sensor 102, the proximity sensor 110, the camera 112, and/or another rear sensing device. For example, the gap controller 120 determines the speed of the trailing vehicle 204 based upon the speed of the vehicle 100 as measured by the vehicle speed sensor 102 and a relative speed (also referred to as a range-rate) of the trailing vehicle 204 with respect to the vehicle 100 as measured by the proximity sensor 110, the camera 112, and/or another rear sensing device. Additionally or alternatively, the gap controller 120 receives a measurement of the speed and/or relative speed of the trailing vehicle 204 from the trailing vehicle 204 via V2V communication. Further, the perception reaction time is a constant (e.g., about 1.5 seconds) that corresponds to a perception reaction time of average driver. In other examples, the perception reaction time of Equation 2 is specific to the driver of the trailing vehicle 204 that is determined based upon measured driving characteristics of the driver and/or is specific to the trailing vehicle 204 based upon collision mitigation features of the trailing vehicle 204. For example, the gap controller 120 receives the perception reaction time that corresponds to the trailing vehicle 204 and/or its driver via V2V communication with the trailing vehicle 204. Further, the gap controller 120 retrieves and/or otherwise collects the coefficient of friction of the road from a database (e.g., a database 314 of FIG. 3) of the vehicle 100, from an external network via the communication module 116, from a nearby vehicle via V2V communication, from a nearby infrastructure node via V2I communication, and from measurements collected by one or more sensors of the vehicle 100.

In the illustrated examples of FIGS. 2A-2E, adaptive cruise control is active for the vehicle 100. The gap controller 120 compares the lead distance 206 to the target lead gap 210 upon detecting the presence of the lead vehicle 202 (e.g., via a front sensing device). Further, the gap controller 120 compares the trailing distance 208 to the target trailing gap 212 upon detecting the presence of the lead vehicle 202 and the trailing vehicle 204 (e.g., via a front sensing device and rear sensing device, respectively).

In FIG. 2A, the gap controller 120 detects the presence of the lead vehicle 202 in front of the vehicle 100 and the presence of the trailing vehicle 204 behind the vehicle 100. Further, the gap controller 120 determines that the lead distance 206 is (slightly) greater than target lead gap 210 and determines that the trailing distance 208 is (slightly) greater than the target trailing gap 212. In other examples, if the gap controller 120 determines that the lead distance 206 is less than target lead gap 210, the cruise control unit 118 decreases the speed of (i.e., decelerates) the vehicle 100 until the lead distance 206 is greater than or equal to the target lead gap 210. Additionally or alternatively, a body control module (e.g., a brake control module 316 of FIG. 3) autonomously performs emergency braking for pre-collision assist upon detecting that the lead distance 206 is less than target lead gap 210.

In FIG. 2B, the gap controller 120 determines that the lead distance 206 is (slightly) greater than target lead gap 210 and determines that the trailing distance 208 is less than the target trailing gap 212. FIG. 2C depicts that the gap controller 120 increases the target lead gap 210 in response to the gap controller 120 determining that the trailing distance 208 is less than the target trailing gap 212. For example, the gap controller 120 increases the target lead gap 210 based upon the trailing distance 208. That is, the target lead gap 210 is a function of the trailing distance 208. The cruise control unit 118 decreases the speed of (i.e., decelerates) the vehicle 100 until the lead distance 206 is greater than or equal to the adjusted target lead gap 210. Further, the gap controller 120 increases the target lead gap 210 to enable the brake control module to initiate emergency braking at a distance (e.g., at the target lead gap 210) farther from the lead vehicle 202. Additionally or alternatively, the gap controller 120 decreases a deceleration rate for adaptive cruise control and/or pre-collision assist to more gradually decelerate upon detecting a deceleration of the lead vehicle 202, thereby deterring the trailing vehicle 204 from colliding with the vehicle 100 as the vehicle 100 decelerates.

In FIG. 2D, the gap controller 120 determines that the lead distance 206 is greater than target lead gap 210 and determines that the trailing distance 208 is greater than the target trailing gap 212. FIG. 2E depicts that the cruise control unit 118 increases the speed of (i.e., accelerates) of the vehicle 100 responsive to the gap controller 120 determining that the lead distance 206 is greater than target lead gap 210 and the trailing distance 208 is greater than the target trailing gap 212. The cruise control unit 118 is configured to accelerate the vehicle 100 until the lead distance 206 equals the target lead gap 210.

Figure 3:
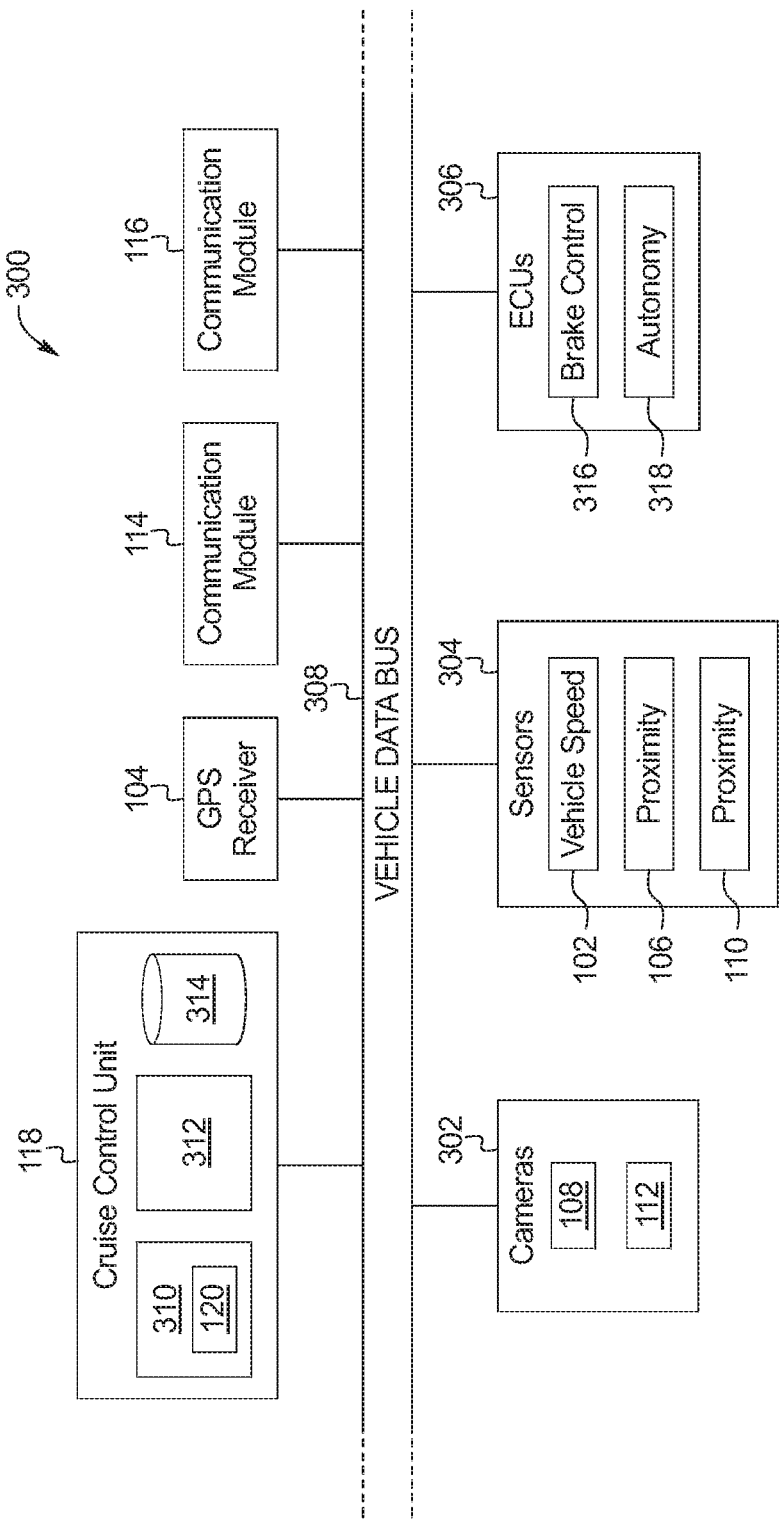
FIG. 3 is a block diagram of electronic components of the vehicle of FIG. 1.

FIG. 3 is a block diagram of electronic components 300 of the vehicle 100. As illustrated in FIG. 3, the electronic components 300 include the cruise control unit 118, the GPS receiver 104, the communication module 114, the communication module 116, cameras 302, sensors 304, electronic control units (ECUs) 306, and a vehicle data bus 308.

The cruise control unit 118 includes a microcontroller unit, controller or processor 310; memory 312; and a database 314. In some examples, the processor 310 of the cruise control unit 118 is structured to include the gap controller 120. Alternatively, in some examples, the gap controller 120 incorporated into another one of the ECUS 306 with its own processor 310, memory 312, and/or database 314. The database 314 stores, for example, entries that correlate target trailing gaps and target lead gaps to location(s) of the vehicle 100, the lead vehicle 202, and/or the trailing vehicle 204; speed(s) of the vehicle 100, the lead vehicle 202, and/or the trailing vehicle 204; an average perception reaction time of a vehicle operator; measured average perception reaction time(s) of vehicle operator(s) of the vehicle 100, the lead vehicle 202, and/or the trailing vehicle 204; a surface friction coefficient of a road; etc. For example, the gap controller 120 retrieves a target trailing gap and/or a target lead gap based upon vehicle speed(s), perception reaction time(s), and surface friction coefficient(s).

The processor 310 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 312 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 312 includes multiple kinds of memory, particularly volatile memory and non-volatile memory.

The memory 312 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 312, the computer readable medium, and/or within the processor 310 during execution of the instructions.

In the illustrated example, the cameras 302 collect image(s) and/or video of a surrounding area of the vehicle 100. For example, the cameras 302 capture image(s) and/or video that are utilized by the cruise control unit 118 to facilitate performance of autonomous and/or semi-autonomous driving maneuvers of the vehicle 100. As illustrated in FIG. 3, the cameras 302 include the camera 108 and the camera 112. The camera 108 collects image(s) and/or video of an area in front of the vehicle 100 (e.g., to monitor the lead vehicle 202), and the camera 112 collects image(s) and/or video of an area behind the vehicle 100 (e.g., to monitor the trailing vehicle 204).

The sensors 304 are arranged in and around the vehicle 100 to monitor properties of the vehicle 100 and/or an environment in which the vehicle 100 is located. One or more of the sensors 304 may be mounted to measure properties around an exterior of the vehicle 100. Additionally or alternatively, one or more of the sensors 304 may be mounted inside a cabin of the vehicle 100 or in a body of the vehicle 100 (e.g., an engine compartment, wheel wells, etc.) to measure properties in an interior of the vehicle 100. For example, the sensors 304 include accelerometers, odometers, tachometers, pitch and yaw sensors, wheel speed sensors, microphones, tire pressure sensors, biometric sensors and/or sensors of any other suitable type.

In the illustrated example, the sensors 304 include the vehicle speed sensor 102, the proximity sensor 106, and the proximity sensor 110. For example, the vehicle speed sensor 102 detects a speed of the vehicle 100. In some examples, the vehicle speed sensor 102 monitors a speed of the vehicle 100 over a period of time to detect an acceleration and/or deceleration of the vehicle 100. Further, the proximity sensor 106 monitors an area in front of the vehicle 100 to detect a presence of, a location of, and/or a distance to an object in front of the vehicle (e.g., the lead vehicle 202). The proximity sensor 110 monitors an area behind the vehicle 100 to detect a presence of, a location of, and/or a distance to an object behind the vehicle (e.g., the trailing vehicle 204). Proximity sensors (e.g., the proximity sensor 106, the proximity sensor 110) include a radar sensor that detects and locates an object via radio waves, a lidar sensor that detects and locates the object via lasers, an ultrasonic sensor that detects and locates the object via ultrasound waves, and/or any other type of sensor that is configured to detect and locate a nearby object.

The ECUs 306 monitor and control the subsystems of the vehicle 100. For example, the ECUs 306 are discrete sets of electronics that include their own circuit(s) (e.g., integrated circuits, microprocessors, memory, storage, etc.) and firmware, sensors, actuators, and/or mounting hardware. The ECUs 306 communicate and exchange information via a vehicle data bus (e.g., the vehicle data bus 308). Additionally, the ECUs 306 may communicate properties (e.g., status of the ECUs 306, sensor readings, control state, error and diagnostic codes, etc.) to and/or receive requests from each other. For example, the vehicle 100 may have seventy or more of the ECUs 306 that are positioned in various locations around the vehicle 100 and are communicatively coupled by the vehicle data bus 308. In the illustrated example, the ECUs 306 include a brake control module 316 and an autonomy unit 318. The brake control module 316 is configured to autonomously operate braking of the vehicle 100, for example, upon receiving a signal from the cruise control unit 118. For example, the brake control module 316 performs emergency braking to prevent the vehicle 100 from colliding with an object that one or more of the cameras 302 and/or the sensors 304 detects is in front of the vehicle 100. In some examples, the brake control module 316 applies emergency braking for pre-collision assist based upon the trailing distance 208 being less than the target trailing gap 212 and/or decreases a deceleration rate for emergency braking responsive to the gap controller 120 determining that the trailing distance 208 is less than the target trailing gap 212. Further, the autonomy unit 318 controls performance of autonomous and/or semi-autonomous driving maneuvers of the vehicle 100 based upon, at least in part, image(s) and/or video captured by the cameras 302 and/or data collected from the sensors 304.

The vehicle data bus 308 communicatively couples the GPS receiver 104, the communication module 114, the communication module 116, the cruise control unit 118, the cameras 302, the sensors 304, and the ECUs 306. In some examples, the vehicle data bus 308 includes one or more data buses. The vehicle data bus 308 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
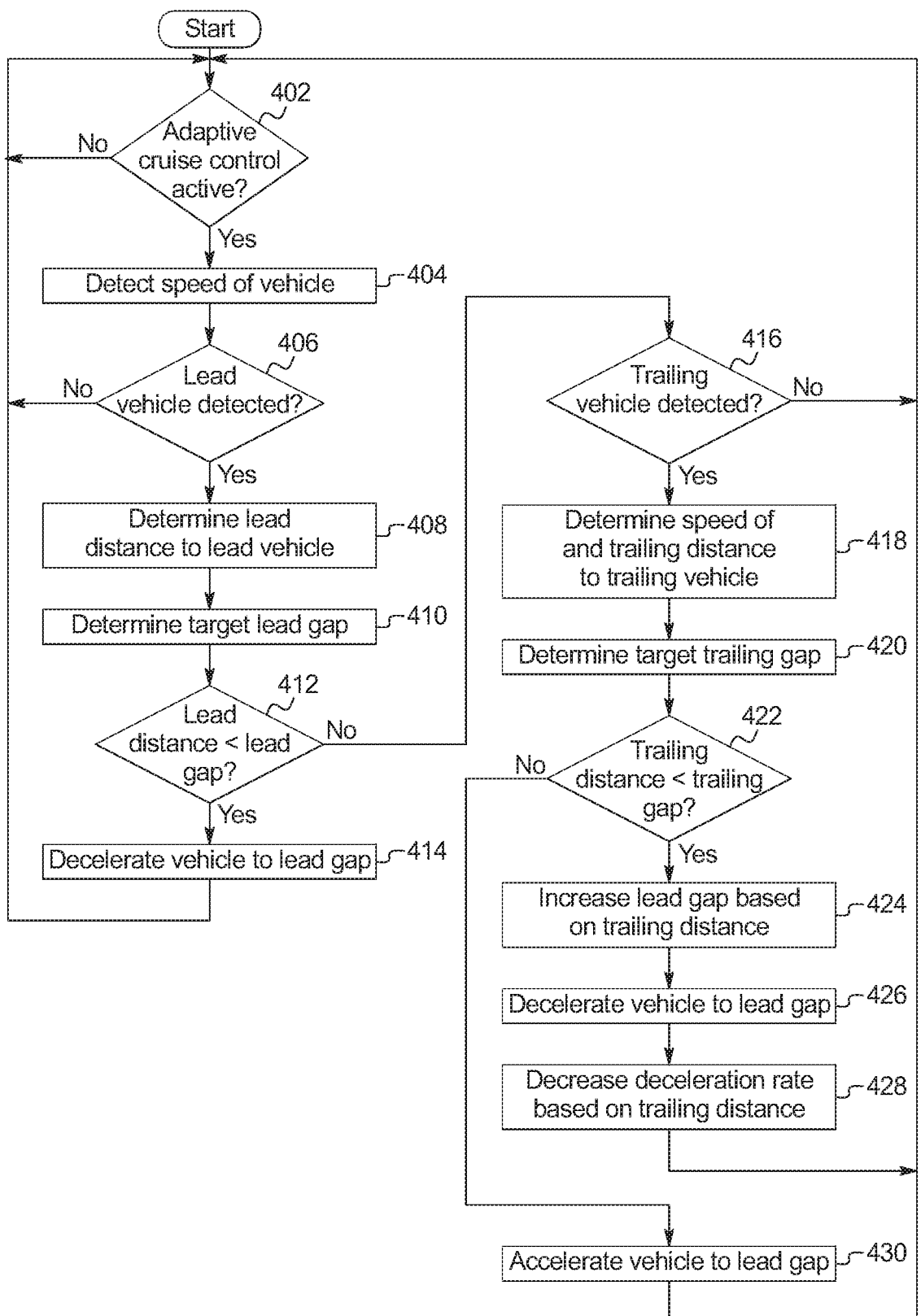
FIG. 4 is a flowchart for monitoring and adjusting gaps between vehicles in accordance with the teachings herein.

FIG. 4 is a flowchart of an example method 400 to monitor and adjust gaps between vehicles. The flowchart of FIG. 4 is representative of machine readable instructions that are stored in memory (such as the memory 312 of FIG. 3) and include one or more programs which, when executed by a processor (such as the processor 310 of FIG. 3), cause the vehicle 100 to implement the example gap controller 120 of FIGS. 1-3. While the example program is described with reference to the flowchart illustrated in FIG. 4, many other methods of implementing the example gap controller 120 may alternatively be used. For example, the order of execution of the blocks may be rearranged, changed, eliminated, and/or combined to perform the method 400. Further, because the method 400 is disclosed in connection with the components of FIGS. 1-3, some functions of those components will not be described in detail below.

Initially, at block 402, the cruise control unit 118 determines whether adaptive cruise control is active. In response to the cruise control unit 118 identifying that the adaptive cruise control has not been activated, the method 400 remains at block 402. Otherwise, in response to the cruise control unit 118 identifying that the adaptive cruise control has been activated, the method 400 proceeds to block 404 at which the cruise control unit 118 detects a speed at which the vehicle 100 is traveling. For example, the cruise control unit 118 detects the vehicle speed via the vehicle speed sensor 102, the GPS receiver 104, and/or V2X communication received by the communication module 114.

At block 406, the cruise control unit 118 determines whether a lead vehicle (e.g., the lead vehicle 202) is detected in front of the vehicle 100. For example, the cruise control unit 118 detects a presence of a lead vehicle via the proximity sensor 106 and/or the camera 108. In response to the cruise control unit 118 determining that a lead vehicle is not in front of the vehicle 100, the method 400 returns to block 402. Otherwise, in response to the cruise control unit 118 determining that a lead vehicle is in front of the vehicle 100, the method 400 proceeds to block 408. At block 408, the gap controller 120 of the cruise control unit 118 determines the lead distance 206 between the vehicle 100 and the lead vehicle. Further, at block 410, the gap controller 120 determines the target lead gap 210, for example, for adaptive cruise control and/or pre-collision assist. At block 412, the gap controller 120 determines whether the lead distance 206 is less than the target lead gap 210.

In response to the gap controller 120 determining at block 412 that the lead distance 206 is less than the target lead gap 210, the method 400 proceeds to block 414 at which the cruise control unit 118 autonomously decelerates the vehicle 100 to position the vehicle 100 at target lead gap 210 behind the lead vehicle 202. Additionally or alternatively, the brake control module 316 autonomously decelerates the vehicle 100 in response to the gap controller 120 determining that the lead distance 206 is less than the target lead gap 210 for pre-collision assist. For example, the brake control module 316 is configured to autonomously decelerate the vehicle 100 for the pre-collision assist when the adaptive cruise control is active and/or inactive.

Further, in response to the gap controller 120 determining at block 412 that the lead distance 206 is not less than the target lead gap 210, the method 400 proceeds to block 416 at which the gap controller 120 determines whether there is a trailing vehicle (e.g., the trailing vehicle 204) behind the vehicle 100. In response to the gap controller 120 determining that there is no trailing vehicle, the method 400 returns to block 402. Otherwise, in response to the gap controller 120 determining that there is a trailing vehicle, the method 400 proceeds to block 418 at which the gap controller 120 determines a speed of and the trailing distance 208 to the trailing vehicle. At block 420, the gap controller 120 determines the target trailing gap 212 between the trailing vehicle and the vehicle 100.

At block 422, the gap controller 120 determines whether the trailing distance 208 is less than the target trailing gap 212. In response to the gap controller 120 determining that the trailing distance 208 is less than the target trailing gap 212, the method 400 proceeds to block 424 at which the gap controller increases the target lead gap 210 based upon the trailing distance 208. For example, the gap controller 120 increases the target lead gap 210 to affect a distance at which the vehicle 100 follows a lead vehicle during adaptive cruise control and/or a distance at which the brake control module 316 begins to decelerate for emergency braking. At block 426, the cruise control unit 118 causes the vehicle 100 to decelerate such that the vehicle 100 is positioned at the adjusted target lead gap 210 during adaptive cruise control. At block 428, the gap controller 120 causes a deceleration rate for braking for adaptive cruise control and/or pre-collision assist to be decreased based on the trailing distance 208 to deter the trailing vehicle 204 from colliding with the vehicle 100 when the vehicle 100 brakes. For example, the deceleration rate is function of the trailing distance 208 that is determined by the gap controller 120. Otherwise, in response to the gap controller 120 determining that the trailing distance 208 is not less than the target trailing gap 212, the cruise control unit 118 accelerates the vehicle 100 until the vehicle 100 is at the target lead gap 210.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module" and "unit" refer to hardware with circuitry to provide communication, control and/or monitoring capabilities, often in conjunction with sensors. A "module" and a "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a rear sensing device; and
   a controller to:
      determine a target lead gap for following a lead vehicle during adaptive cruise control;
      measure, via the rear sensing device, a trailing distance to a trailing vehicle;
      determine a target trailing gap for the trailing vehicle; and
      increase, responsive to the trailing distance being less than the target trailing gap, the target lead gap based on the trailing distance.

2. The vehicle of claim 1, further including a cruise control unit configured to decrease a vehicle speed to increase a lead distance to the lead vehicle to the target lead gap.

3. The vehicle of claim 1, wherein the rear sensing device includes a camera.

4. The vehicle of claim 1, wherein the rear sensing device includes a proximity sensor that includes at least one of a radar sensor, a lidar sensor, and an ultrasonic sensor.

5. The vehicle of claim 1, further including a front sensing device for monitoring the lead vehicle.

6. The vehicle of claim 5, wherein the controller compares the trailing distance and the target lead gap upon the front sensing device detecting the lead vehicle and the rear sensing device detecting the trailing vehicle.

7. The vehicle of claim 5, further including a cruise control unit that increases a vehicle speed responsive to the controller determining that a lead distance measured by the front sensing device is greater than the target lead gap.

8. The vehicle of claim 7, wherein the cruise control unit decreases the vehicle speed responsive to the controller determining the lead distance is less than the target lead gap.

9. The vehicle of claim 1, further including a vehicle speed sensor to detect a vehicle speed.

10. The vehicle of claim 9, wherein the controller determines the target lead gap based on the vehicle speed.

11. The vehicle of claim 1, wherein the controller determines the target trailing gap based on a trailing vehicle speed of the trailing vehicle.

12. The vehicle of claim 11, further including a dedicated short-range communication module to receive the trailing vehicle speed via vehicle-to-vehicle communication.

13. The vehicle of claim 1, wherein the controller determines the target trailing gap based on a coefficient of friction of a road surface and a perception reaction time of a driver.

14. The vehicle of claim 13, further including:
   a GPS receiver to identify a vehicle location; and a communication module to retrieve the coefficient of friction of the road surface from an external network based on the vehicle location.

15. The vehicle of claim 1, further including a brake control module that applies emergency braking for pre-collision assist based upon the trailing distance being less than the target trailing gap.

16. The vehicle of claim 15, wherein the brake control module decreases a deceleration rate for the emergency braking responsive to the controller determining that the trailing distance is less than the target trailing gap.

17. A method comprising:
   determining, via a processor, a target lead gap for a vehicle to follow a lead vehicle;
   measuring, via a rear sensing device of the vehicle, a trailing distance to a trailing vehicle;
   determining, via the processor, a target trailing gap for the trailing vehicle; and
   increasing the target lead gap based on the trailing distance responsive to the trailing distance being less than the target trailing gap.

18. The method of claim 17, further including decreasing, via a cruise control unit, a vehicle speed to increase the target lead gap to the lead vehicle during adaptive cruise control.

19. The method of claim 17, further including:
   measuring, via a front sensing device, a lead distance to the lead vehicle; and
   increasing, via the processor, a vehicle speed responsive to determining the lead distance is greater than the target lead gap.

20. The method of claim 17, further including decreasing, via a brake control module, a deceleration rate for emergency braking responsive to determining the trailing distance is less than the target trailing gap.

* * * * *